G. H. ROBINSON.
RESILIENT WHEEL FOR VEHICLES.
APPLICATION FILED JUNE 16, 1913.

1,090,087.

Patented Mar. 10, 1914.

WITNESSES
B. A. Hanway
S. K. Mickels

George Hunter Robinson INVENTOR
BY
Mason Fenwick + Lawrence
ATTORNEY

UNITED STATES PATENT OFFICE.

GEORGE HUNTER ROBINSON, OF BAYSWATER, LONDON, ENGLAND.

RESILIENT WHEEL FOR VEHICLES.

1,090,087. Specification of Letters Patent. Patented Mar. 10, 1914.

Application filed June 16, 1913. Serial No. 774,015.

*To all whom it may concern:*

Be it known that I, GEORGE HUNTER ROBINSON, a subject of the King of Great Britain and Ireland, and residing at 144 Queen's road, Bayswater, in the county of London, England, have invented certain new and useful Improvements in Resilient Wheels for Vehicles, of which the following is a specification.

This invention relates to resilient wheels for vehicles of the type in which the tire is held between two rims set at an inclination to one another, one of which is fixed while the other is movable in an outward direction.

In certain devices hitherto proposed the tire and rims have been arranged in relation to one another in such a manner that the lateral extension of the material of the tire is made use of to cause the movement of the movable rim member, such movement being transferred to the upper part of the rim member with the result that the material of the tire is laterally compressed at the upper part of the wheel.

The object of the present invention is to devise an improved form of resilient wheel of the above type by arranging that the radial pressure upon the lower part of the tire shall be transferred direct to the upper part of the tire so that the wheel becomes, as it were, a suspension wheel supporting the weight of the vehicle from the upper part of the wheel.

The invention consists in the novel structure hereinafter specified.

Figure 1:
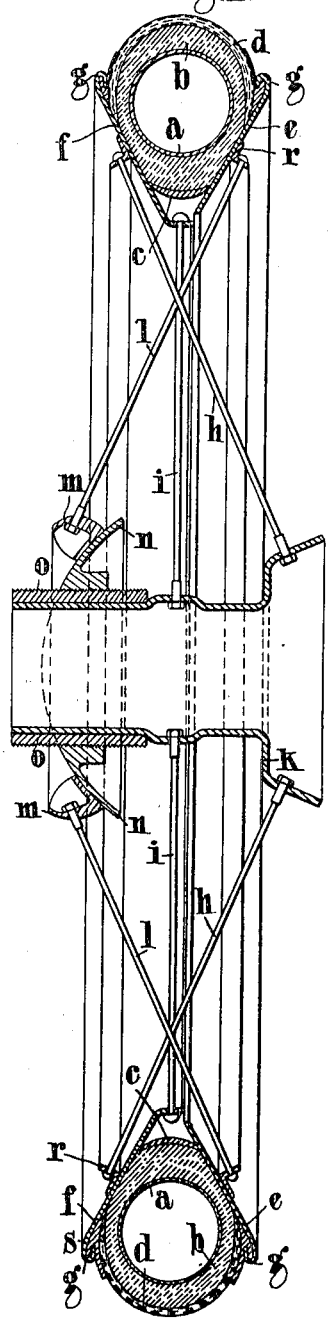
Figure 2:
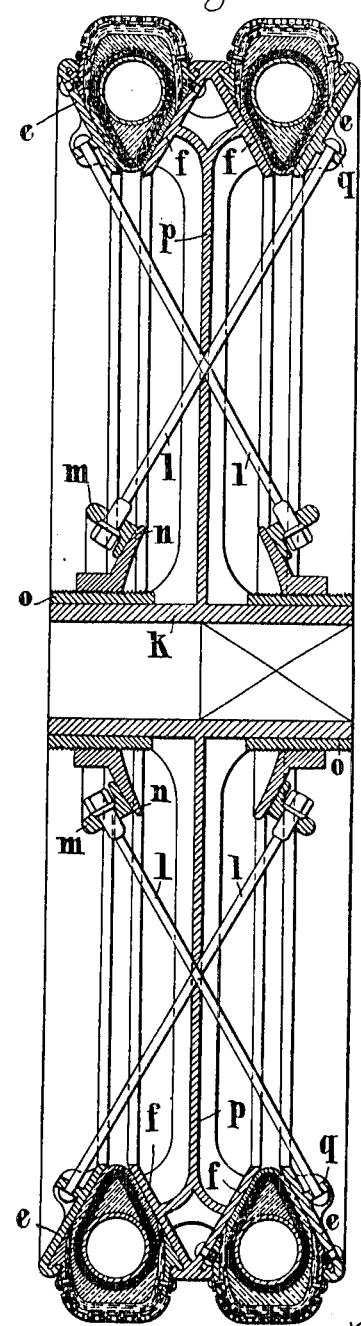
Figure 3:
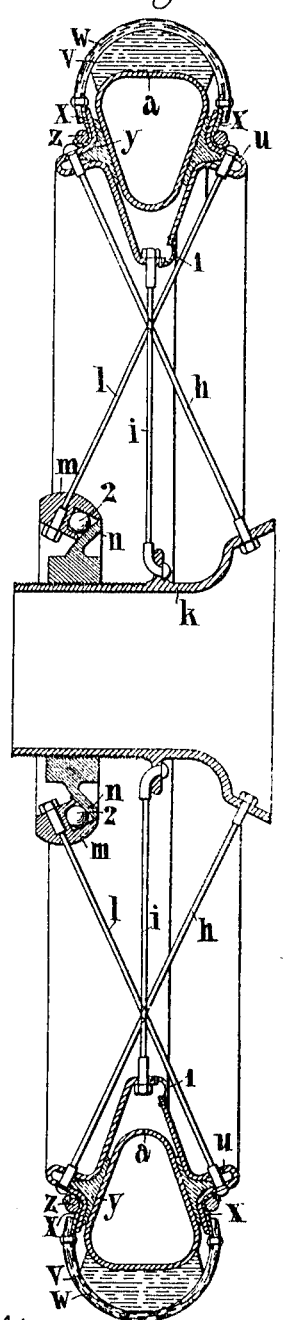

The accompanying drawings illustrate three modes of carrying out the invention. Figure 1 is a cross-sectional elevation showing one convenient form of wheel constructed in accordance with the invention. Fig. 2 illustrates the invention in one convenient application to a heavier type of wheel. Fig. 3 is a similar view to Fig. 1 showing a modification.

In carrying my invention into effect in one convenient manner as illustrated, for example, in Fig. 1 I form the tire of the vehicle wheel from a substantially rigid and non-compressible ring or tube $a$ of suitable metal preferably steel, of circular, oval, or other convenient cross-section and embedded or surrounded by a suitable thickness of rubber or other material $b$, the shape of the tire in cross section being made to conform to the inclination of the angular rims used in conjunction with the tire as hereinafter described. The inner surface of the rubber or other tire $b$ may be strengthened or reinforced by a rim or ring $c$ of steel or other suitable metal while the outer surface $b$ is covered with a flexible tread or covering $d$ of leather or the like which is attached to the annular rims $e$ $f$ at $g$ by the steel clips $s$ or by other suitable means. The tire is mounted between a pair of annular rims $e$ $f$ set at an inclination to one another or arranged wedge fashion, the rims being provided with hoop-like or flanged edges $g$ or otherwise suitably adapted for retaining the tire in position. The rim $f$ is stayed by means of two sets of spokes or the like $h$ $i$, the spokes $i$ being connected with the central portion of the hub $k$ of the vehicle wheel while the other set $h$ is connected to that side of the hub $k$ remote from the rim $f$. The rim $f$ is thus held rigid or fixed and the rim $e$ is supported only by one set of spokes $l$ so as to be capable of outward movement. The spokes $l$ are connected with a ring or collar $m$ of suitable form and size slidably mounted upon a cap or boss $n$ secured to that side of the hub of the vehicle wheel remote from the rim $e$, the cap or boss being saucer-shaped or formed from a portion of a sphere and being in one convenient form adapted to be screwed upon a threaded bush $o$ rigidly mounted upon the hub, the cap or boss being held in any desired position by any suitable means. It will be seen that by adjusting the position of the cap or boss in relation to the hub the tension in the spokes $l$ may be suitably adjusted, and in order to obtain the best result with my improved form of wheel I fashion the boss or cap such that the center of the circle or arc of a circle formed by the median plane of the boss approximates to the center of the circle about which the free rim $e$ tends to move.

When the load comes upon the under-side of a vehicle wheel constructed as hereinbefore described the floating ring or the like $a$ is forced between the rims $e$ and $f$ exerting a wedge-like action whereby the movable rim $e$ is forced slightly outward while the upper part of the rim $e$ moves toward the rim $f$ as the ring $a$ is moved upward, this latter movement transferring the radial pressure on the lower side of the tire to the upper periphery thereof so that the wheel becomes, as it were, a suspension wheel supporting the weight of the vehicle from the upper part of the wheel, the spoke members above referred to being in a state of tension.

Fig. 2 illustrates a modified form of construction when applying the invention to heavier types of wheels, the construction and mode of action being substantially similar to that described with reference to the foregoing modification. In this particular construction wherein double tires are employed there are two free rims $e$ with sliding rings and spokes connected therewith and for convenience in construction the fixed rims $f$ are formed in one with one another and by means of a central web $p$ are secured to or formed integral with the hub $k$ of the vehicle wheel.

In Fig. 3 there is illustrated a still further modification of the invention in which the ring or tube $a$ is not embedded entirely in hard rubber or like material but has strips or pads $t$ of hard rubber or like material in contact with a portion of the surface of the ring which is conveniently formed after the manner of a wedge to suit the inclination of the side rims and the latter are provided with hollow annular lugs $u$ stamped, pressed, or otherwise formed within which the pads or strips $t$ are secured in any suitable manner, a certain amount of clearance being left if necessary within the hollow lugs to accommodate any movement of the pads or strips referred to. The outer surface of the ring or tube $a$ is adapted to be embraced by an integral or sectional tread $v$ of hard rubber or the like, and this is further protected and held in place by means of a leather or like protecting member $w$ to the edges of which hook-like members $x$ are secured in any convenient manner such that they may be held in place by rings or the like $z$ adapted to embrace the annular lugs $u$.

In any modification of my invention I prefer to secure to the inner edges of the rims a strip 1, of leather or canvas or like flexible material so as to completely inclose the spaces around the inner tube or ring to assist in the lubrication of the internal wearing surfaces of the wheel.

It will be obvious that the methods and materials employed in the construction of my improved resilient wheel and tire therefor may be variously modified to suit any particular type of wheel that is required and the various types of vehicles to which the wheel may be applied as it will be clear that with suitable modifications my invention may be equally well applied to disk wheels as to those in which the usual spoke members are employed. The side rims may be formed from an integral piece of material as shown and provided with means as the annular rim $r$ (Fig. 1) by which the spokes may be attached or the rims may be formed in two parts having flanges that abut against one another at about the central portion of the complete rim whereby the two parts of the rim may be readily secured together by means of the spoke members, the flanges forming a ready means of attachment for the spokes.

In the form illustrated in Fig. 3 I have shown the sliding collar provided with ball bearings, 2, and it is to be understood that this feature may be embodied in any modification of the invention for the purpose of minimizing wear and to obviate the disadvantages arising from excessive friction.

Having now described my invention, what I claim as new and desire to secure by Letters Patent is:—

1. In a resilient wheel, a fixed rim and a movable rim arranged to form a channel, a non-compressible ring between said rims, a hub, a boss thereon on the side of the wheel opposite the movable rim, a collar movable with reference to the boss, and devices extending diagonally across the vertical axis of the wheel and connecting the collar with the movable rim.

2. In a resilient wheel, a fixed rim and a movable rim arranged to form a channel with converging sides, a non-compressible ring between said rims, means surrounding the ring and connecting the rims, a hub, a boss thereon on the side of the wheel opposite the movable rim, a collar movable with reference to the boss, and devices extending diagonally with reference to each other and extending across the vertical axis of the wheel, certain of the devices connecting the collar with the movable rim.

In testimony whereof I have signed my name to this specification in the presence of two subscribing witnesses.

GEORGE HUNTER ROBINSON.

Witnesses:
 LIONEL GODFREY STRUDWICK,
 C. C. GIBBONS.